United States Patent [19]

Habart

[11] Patent Number: 4,924,700

[45] Date of Patent: May 15, 1990

[54] APPARATUS FOR MEASURING STORAGE PARAMETERS SUCH AS LEVEL AND TEMPERATURE OF LIQUIDS OR FLUIDS OF DIFFERENT DENSITIES IN A TANK

[75] Inventor: Philippe Habart, Marquise, France

[73] Assignee: Whessoe. S.A., Calais, France

[21] Appl. No.: 283,626

[22] Filed: Dec. 13, 1988

[30] Foreign Application Priority Data

Dec. 16, 1987 [FR] France .............................. 87 17562

[51] Int. Cl.$^5$ ...................... G01F 23/28; G01K 11/22
[52] U.S. Cl. .................... 73/290 V; 73/292;
73/447; 367/908; 374/102; 374/142
[58] Field of Search ................ 73/290 R, 290 V, 292, 73/32 A, 295; 374/102, 142; 367/908

[56] References Cited

U.S. PATENT DOCUMENTS

| 4,404,514 | 9/1983 | Reichert, Jr. .................. 324/533 X |
| 4,409,832 | 10/1983 | Kongedic et al. ..................... 73/292 |
| 4,499,417 | 2/1985 | Wright et al. ........................ 324/533 |
| 4,805,453 | 2/1989 | Haynes ................................. 73/292 |

FOREIGN PATENT DOCUMENTS

| 0138541 | 4/1985 | European Pat. Off. . |
| 2215610 | 8/1974 | France .............................. 73/290 X |
| 1448282 | 9/1976 | United Kingdom ......... 73/290 V X |

Primary Examiner—Daniel M. Yasich
Attorney, Agent, or Firm—Ladas & Parry

[57] ABSTRACT

The invention relates to apparatus for measuring storage parameters such as level and temperature relating to immiscible liquids or fluids in a tank. The apparatus comprises a pulse generator (1) for generating pulses which are applied to a delay line (3) with reflected pulses being representative of the depths of the various liquids constituting propagation transitions through different media (I, II, III, IV, etc.). Logic means (Li) are switched on by a measurement pulse (Im) and they are switched off by corresponding reflected pulses (Ii) generated by transitions of order i. Integrator means (Ji) for integrating the signals delivered by the logic means (Li) serve to generate respective voltages proportional to the time lapse between the measurement pulse (Im) and each of the reflected pulses (Ii) under consideration. Multiplexer means serve to sequentially deliver the measured values corresponding to the different liquids of order i in the tank. The apparatus is suitable for surveillance and management of hydrocarbon tanks.

8 Claims, 2 Drawing Sheets

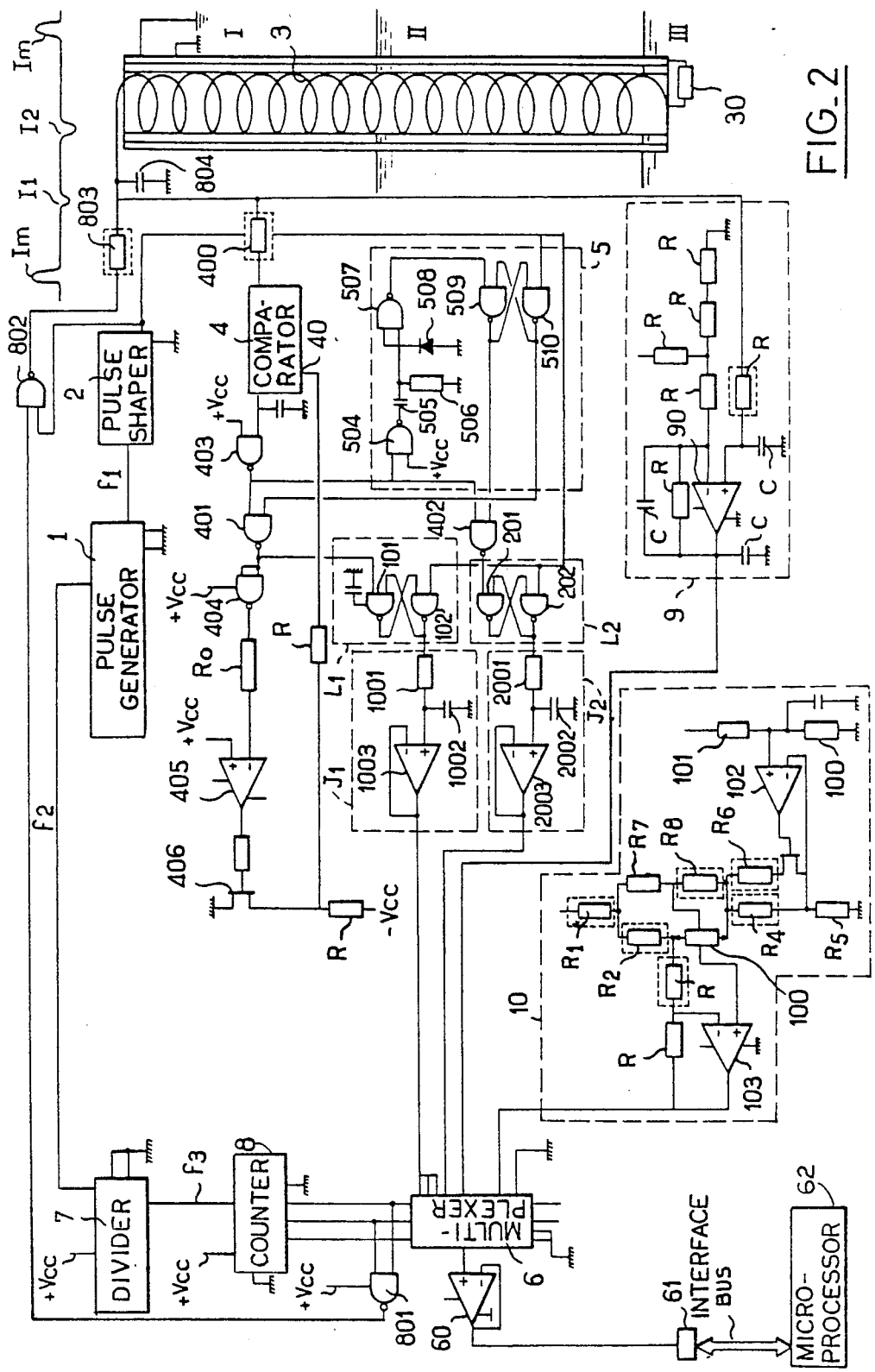
FIG_2

APPARATUS FOR MEASURING STORAGE PARAMETERS SUCH AS LEVEL AND TEMPERATURE OF LIQUIDS OR FLUIDS OF DIFFERENT DENSITIES IN A TANK

The present invention relates to apparatus for measuring storage parameters such as level and temperature of liquids or fluids in a tank.

BACKGROUND OF THE INVENTION

At present, liquids or fluids stored in tanks, e.g. hydrocarbon liquids, are under constant surveillance, particularly in installations such as oil refineries, for purposes of reliable economic management and to achieve a high degree of safety with such large volumes of fuel.

In order to measure the level of the liquids, proposals have already been made for systems in which a substantially vertical electrical transmission line is partially immersed in the fluid and is connected to a source of electrical measuring pulses which are applied to the line. The measuring pulses are partially reflected by the plane of dielectrical discontinuity constituted by the free surface of the liquid in the tank (e.g. a hydrocarbon) where it meets the atmosphere occupying the empty portion of the tank.

Reference may be made to French patent application number 73 39188 filed Nov. 5, 1973 or Great Britain No. 1,448,282 published Sept. 2, 1976 by the present Applicant for a description of this type of apparatus.

The apparatus described provides a good measurement of the level of the separation between the liquid constituted by a hydrocarbon and the upper empty portion of the tank. However, in most cases, the fluid constituted by the hydrocarbon is floating on bottom water, and measuring the liquid level corresponding to the first transition between the atmosphere and the hydrocarbon does not give the real depth or the real volume of the hydrocarbon contained in the tank. It is therefore not possible to measure the real depth of one of the fluids on a permanent basis given the presence of one or more other fluids.

In addition, in order to provide complete surveillance of such tanks, it is advantageous to be able to measure both the temperature of the atmosphere occupying the empty portion of the tank and of the fluid, e.g. the hydrocarbon, constituting the first transition with the atmosphere in the tank, with such measurements being performed independently of the real level of the transition.

Present temperature measuring devices must therefore either include measuring probes mounted on floats, or else they must provide a plurality of probes distributed over the inside surface of the tank, for example.

The object of the present invention is to remedy the above-mentioned drawbacks by implementing a single apparatus for measuring storage parameters such as level and temperature of liquids or fluids of different densities in a tank.

Another object of the present invention is to implement apparatus for measuring the storage parameters of liquids or fluids in a tank making it possible to obtain the effective depth of each of the fluids or liquids of different density in the presence of other fluids or liquids.

Another object of the present invention is also to provide apparatus for measuring the average temperature of a given fluid or liquid contained in a tank, taking account of the temperature value of the vapor phase of said liquid or fluid constituting the top atmosphere or void in the tank.

SUMMARY OF THE INVENTION

The apparatus for measuring storage parameters such as level and temperature of liquids or fluids of different densities in a tank, comprises a pulse generator for generating pulses at adjustable frequency and delivering a first clock signal at frequency f1, and a pulse shaping circuit delivering calibrated measurement pulses to a delay line constituted by a helical winding disposed substantially vertically inside the tank, with the end of said delay line disposed in the vicinity of the bottom of the tank being connected to a resistance.

The apparatus is remarkable in that it comprises: comparator means having a comparison input terminal connected to the inlet terminal of said delay line and having an output terminal suitable for delivering a signal when a pulse is present on said comparison terminal; a plurality of logic means connected in parallel to the output of said comparator means, with each logic means being firstly switched on by the appearance of a calibrated pulse at the input terminal of the delay line, and being secondly switched off by the corresponding reflection pulse generated by said line at the i-th transition between a medium of order i and a medium of order i+1; integrator means, with each integrator means of order i being connected to the output of said logic means of corresponding order and serving to generate a voltage proportional to the time for which the corresponding logic means is switched on; conditional inhibit means having one input receiving said pulses delivered by the comparator means, and n outputs, with outputs of order i and of lower order of the conditional inhibit means delivering a signal for switching off the corresponding logic means on the appearance of the corresponding reflected pulse Ii at the output from the comparator means; and multiplexer means having multiplexing inputs connected to respective ones of the outputs from said integrator means.

Apparatus of the invention is applicable to the surveillance and management of tanks of all sorts of fluid, and in particular to tanks of hydrocarbons in industrial refineries or in service stations.

BRIEF DESCRIPTION OF THE DRAWINGS

An embodiment of the invention is described by way of example with reference to the accompanying drawings, in which:

FIG. 2 shows a particular, non-limiting embodiment of apparatus in accordance with the invention, for the specific case of a tank such as a hydrocarbon tank in which the following fluids are generally to be encountered:

Figure 1:
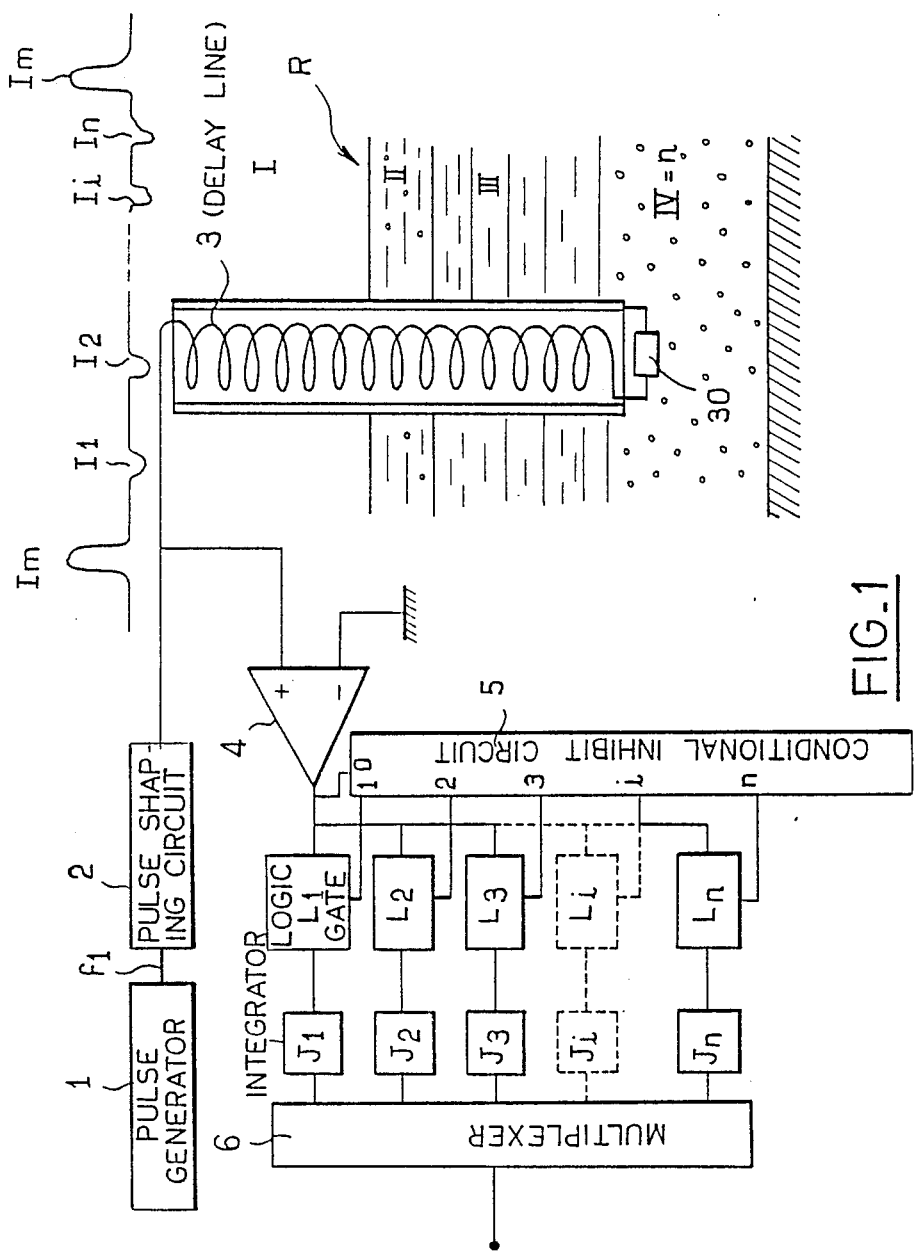
FIG. 1 is a schematic diagram of apparatus in accordance with the invention in a configuration corresponding to a large number of different-density liquids or fluids.

a first fluid I in the top of the tank and corresponding to the vapor phase of the hydrocarbon under consideration;

a second fluid II constituted by the liquid phase of the hydrocarbon; and a third fluid III constituted by the water at the bottom of the tank on which the fluid II is floating by virtue of the difference in density.

MORE DETAILED DESCRIPTION

The apparatus for measuring storage parameters such as level and temperature of liquids or fluids of different densities in a tank and in accordance with the present invention is initially described with reference to FIG. 1.

In conventional manner, apparatus of the invention as shown in above-mentioned FIG. 1 comprises a pulse generator 1 for generating pulses at an adjustable frequency and delivering a first clock signal at a frequency marked f1. In addition, a pulse shaping circuit 2 is connected to the output of the pulse generator 1 and delivers calibrated measurement pulses referenced Im to a delay line 3. The delay line 3 is constituted by a helical winding disposed substantially vertically inside the tank R.

As shown in FIG. 1, the end of the delay line 3 disposed in the vicinity of the bottom of the tank is connected to a resistor 30 which serves as a resistance for dissipating the incident measurement pulses Im after they have been attenuated at the various transitions between media such as I, II, III, and IV, with the diagram being non-limiting and restricted to four media merely to avoid pointlessly overcrowding the drawing. It will naturally be understood that a measurement pulse Im present on the inlet terminal of the delay line 3 propagates along the delay line and a portion of the energy of the measurement pulse Im is reflected at each transition, i.e. transition I-II, transition II-III, and transition III-IV, with the reflected pulse propagating in the opposite direction along the delay line 3, i.e. towards its inlet terminal. Naturally, the resistor 30 acting as a dissipating resistance allows the end of the delay line 3 to provide total absorption of the residual incident measurement pulses Im, with the end of the delay line 3 and its dissipating resistance 30 naturally being located close to the bottom of the tank.

For a more detailed description of the physical operation of this type of delay line in an application which consists in measuring the level of a liquid in a tank, reference may be made to the above-mentioned French patent application No. 73 39188. The different dielectric constants of the media I, II, and III have the effect of modifying the propagation conditions for the measurement pulses Im and of generating a reflection pulse I1, I2, Ii at each transition by virtue of the discontinuity in the dielectric medium, with said reflected pulses propagating in the opposite direction towards the inlet terminal of the delay line. Naturally, these reflected pulses I1, I2, Ii, and In appear in succession at the inlet terminal of the delay line after the measurement pulse Im which gives rise to them.

According to a particularly advantageous aspect of the invention, the apparatus includes comparator means 4 having a comparison input terminal connected to the inlet terminal of the delay line 3 and having an output terminal for delivering a signal representing the presence of a pulse at the above-mentioned comparison terminal. In FIG. 1, the positive terminal of a differential amplifier is shown as being connected to the inlet terminal of the delay line 3, with the negative terminal of the differential amplifier being connected to a reference voltage and with the output terminal of the differential amplifier 4 constituting the comparator means then delivering output signals from the comparator 4 comprising a positive pulse for each measurement pulse Im, and a negative pulse for each reflected pulse I1, I2, Ii.

As can also be seen in FIG. 1, apparatus of the invention further includes a plurality of logic means referenced L1, L2, Li, and Ln which are connected in parallel to the output from the comparator means 4. Each logic means Li is firstly switched on via the comparator means 4 by the appearance of a calibrated measurement pulse Im at the inlet terminal of the delay line 3. The same logic means Li is secondly switched off via the comparator means 4 by the corresponding reflection pulse Ii generated in the delay transmission line 3 at the transition of order i between a medium of order i and a medium of order (i+1).

Integrator means referenced J1, J2, Ji, Jn are also provided with each integrator means of order i referenced Ji being connected to the output of the corresponding logic means Li and serving to generate a voltage which is proportional to the time for which the corresponding logic means Li is switched on.

As can be seen in FIG. 1, conditional inhibit means 5 are also provided, with said means including an input receiving the pulses delivered by the comparator means 4 together with n outputs. Outputs of order i and of lower order from the conditional inhibit means 5 deliver control signals for switching off the corresponding logic means Li on the appearance at the output of the comparator means 4 of the corresponding reflected pulse Ii. In FIG. 1, the input terminal of the conditional inhibit means 5 is referenced 0 and the corresponding outputs are referenced 1, 2, 3, i, n.

Multiplexer means 6 are also provided with the multiplexing input terminals being respectively connected to the outputs of the integrator means Ji. The output from the multiplexer means 6 thus delivers, in series, the value of the output signal sequentially delivered by each of the integrator means Ji, as described in greater detail below.

Apparatus as shown in FIG. 1 operates as follows:

When a calibrated measurement pulse Im appears at the output from the comparator means 4, it has the effect, firstly, of resetting to zero the logic means Li and switching them on. The calibrated measurement pulse Im also has the effect of resetting to zero the conditional inhibit means 5 via its input terminal 0, so that all of the outputs 1, 2, 3, i, n of the conditional inhibit means 5 are then set to logic level 0 by virtue of the signal applied to input terminal 0, with said logic level corresponding, for example, to the control signal for switching on each of the logic means Li under consideration. The appearance of the first reflected pulse I1 at the output from the comparator means 4 has the effect of causing output 1 of the conditional inhibit means 5 to switch to logic level 1, thereby switching off the above-mentioned logic means L1. However, outputs 2, 3, i, n of the conditional inhibit means 5 remain at logic level 0 so logic means L2 to Li, and Ln remain ON. The appearance of reflected pulse I2 at the output from the comparator means 4 has the effect of causing output 1 from the conditional inhibit means to L1 maintained at logic level 1 so that corresponding logic means L1 is maintained in the OFF state, and also of causing output 2 of conditional inhibit means 5 to switch to logic state 1, thereby causing the corresponding logic means L2 to switch to the OFF state, with the other logic means L3, Li, Ln being maintained in the ON state. It will readily be understood that the appearance of a higher order reflected pulse, e.g. a pulse of order 3, has the effect of causing logic means L3 to switch to the OFF state, in turn, with logic means L1 and L2 being maintained in the OFF state and with higher order logic means being maintained in the ON state, and so on. It is advantageous, but not essential, for the conditional inhibit means 5 to be constituted by a shift register type of circuit or even by a counter type of circuit.

Naturally the period or recurrence frequency of the measurement pulses Im may be adjusted by means of the pulse repetition frequency f1 of the clock as a function of the physical parameters of the tank R and the number of media that said tank is likely to contain.

In addition, it will be understood that the various reflected pulses I1, I2, Ii, In, may have different amplitudes by virtue of the different dielectric constant values of the fluid or liquid media providing transitions in the tank and because of the varying propagation conditions for pulses along the delay line 3.

Finally, it will be observed that each logic means Li may be constituted by a bistable type of circuit with its ON state corresponding to a high logic level, i.e. logic level 1 represented by a high voltage value, and with its OFF state corresponding to a low logic level, i.e. logic level 0 or a low voltage level. Under such conditions, the integrator circuit Ji integrates the corresponding signal between the high logic level and the low logic level for the duration corresponding to the time interval lying between the calibrated measurement pulse Im and the corresponding reflected pulse Ii of order i. The integrator means Ji then deliver a voltage proportional to said duration.

Another, more detailed embodiment of apparatus in accordance with the invention is now described with reference to FIG. 2 for a tank R having two transitions corresponding to three different-density media in the tank, said media being respectively referenced I, II, and III.

As shown in above-mentioned FIG. 2, the plurality of logic means includes a first logic circuit constituting the first logic means L1, comprising two two-input NAND gates 101 and 102. The output from the first NAND gate 101 is connected to a first input of the second NAND gate 102, and the output from the second NAND gate 102 constituting the output of the corresponding logic means L1 is connected to the second input of the first NAND gate 101.

A second logic circuit constituting the second logic means L2 is also provided and likewise comprises two two-input NAND gates 201 and 202. The output from the first NAND gate 201 is connected to a first input of the second NAND gate 202, and the output of the second NAND gate 202 constitutes the output of the corresponding logic means L2 and is connected to the second input of the first NAND gate 201. The first inputs of the first NAND gates 101 and 201 of the first and second logic circuits L1 and L2 are connected to the output of the comparator means 4 via respective intermediate NAND gates 401 and 402 each having a first input connected in cascade to a common NAND gate 403. The first input of the common NAND gate 403 is connected to the supply voltage +Vcc of the apparatus and the second input of the common NAND gate 403 is connected to the output of the comparator means 4.

As also shown in FIG. 2, the conditional inhibit circuit 5 is a circuit having two outputs, with each of the outputs from the conditional inhibit circuit being connected to a respective one of the second inputs of the corresponding intermediate NAND gates 401 and 402.

As shown in FIG. 2, the conditional inhibit circuit 5 comprises a first two-input NAND gate 504 having a first input connected to the output of the common NAND gate 403 and having its second input connected to the supply voltage +Vcc. A link circuit comprising a capacitor 505 and a resistor 506 is connected in cascade with a NAND gate 507 whose inputs are connected in parallel and are also connected to the reference voltage via reverse-biased diode 508.

A logic circuit comprising two two-input NAND gates is provided, with the output of the first NAND gate 509 being connected to the first input of the second NAND gate 510, and the output from the second NAND gate 510 being connected to the second input of the first NAND gate 509. The outputs from NAND gates 509 and 510 constitute the outputs from the conditional inhibit logic means 5 described above. The first input of the first NAND gate 509 is connected to the output from the NAND gate 507 of the link circuit and the second input of the second NAND gate 510 is connected to the output of the circuit 2 for shaping the measurement pulses.

The operation of the conditional inhibit circuit 5 shown in FIG. 2 is entirely analogous to the operation of the same circuit as shown in FIG. 1, with the NAND gates 509 and 510 constituting a kind of base 2 counter for the reflected pulses I1 and I2. The outputs from the conditional inhibit circuit 5 shown in FIG. 2 then serve to count the first pulse I1 and switch off the logic means L1 via the first intermediate NAND gate 401, and then to switch off the second logic means L2 via the second intermediate NAND gate 402 on detecting and counting the second reflected pulse I2, with the logic means L1 being maintained in the OFF state by means of above-mentioned intermediate NAND gate 401. Logic means L1 and L2 act as two-state bistables, as described above with reference to FIG. 1.

According to an advantageous aspect of the apparatus of the invention, the comparator means 4 are constituted by a threshold comparator having an input 40 for adjusting the comparison threshold. Comparators such as comparator 4 are normally available in commerce and are not described in greater detail herein.

According to an advantageous characteristic, the apparatus of the invention as shown in FIG. 2 further includes a servo-control circuit referenced 404, 405, and 406 for adjusting the trigger threshold of the comparator means 4 in order to obtain pulses of substantially constant width at the output from said comparator means. To this end, as can also be seen in FIG. 2, the servo-control circuit is constituted by a NAND gate 404 which delivers a signal to an amplifier 405 whenever a pulse is present on the first intermediate NAND gate 401. A transistor 406 connected at the output of the amplifier 405 reinjects a threshold level to the input 40 of the comparator 4, with said level being adjustable as a function of the value of the signal delivered by the amplifier 405. In the overall circuit of FIG. 2, there are several components referenced R constituting resistors for appropriately biasing various other components, with such components being normally available in commerce. In addition, the resistances of the resistors R are selected in conventional manner by the person skilled in the art to match the various impedances of the components so as to ensure that signals are properly transmitted.

As shown in FIG. 2, the apparatus of the invention also includes a pulse frequency divider circuit 7 which receives a second clock signal at frequency f2. The second clock signal may naturally be derived from the pulse generator 1. The divider circuit 7 delivers a third clock signal at frequency f3 and this signal is used for stepping the multiplexer 6 via a counter 8.

A first NAND gate 801 is interconnected between the counter 8 and the multiplexer 6 and is powered from the reference power supply voltage +Vcc. The output from the NAND gate 801 periodically delivers the power supply voltage +Vcc at the frequency f3.

A second NAND gate 802 is provided having a first input connected to the output of the first NAND gate 801 and a second input connected to the output of the pulse shaping circuit 2 which delivers the calibrated measurement pulses Im. The second NAND gate 802 serves to periodically replace the measurement pulses Im by the power supply voltage +Vcc, and delivers either measurement pulses Im, or else the power supply voltage +Vcc to the delay line 3 via a resistor 803 which forms a divider bridge with the line and a decoupling capacitor 804.

In accordance with a particularly advantageous aspect of the apparatus of the invention as shown in FIG. 2, the apparatus may include a circuit 9 for measuring the average temperature in the tank R. The circuit 9, as shown in FIG. 2, may comprise an amplifier 90 whose input terminal is connected to the common point of the delay transmission line 3, the resistor 803 constituting a divider bridge with the delay line 3, and the decoupling capacitor 804. The output from the amplifier circuit 90 is connected to a multiplexing input of the multiplexer 6.

Under these conditions, the winding or coil of the delay transmission line 3 then carries a direct current when the NAND gate 802 delivers the power supply voltage +Vcc and the voltage at the above-mentioned winding terminals is then a function of the winding resistance and thus of the average temperature of the delay line, i.e., in particular, a function of the portion thereof which is immersed in the fluid or liquid constituted by the hydrocarbon.

Similarly, the apparatus of the invention as shown in FIG. 2 further includes a circuit 10 for measuring the temperature at the top of the tank R in order to determine the temperature of the first fluid or liquid. When the second fluid or liquid is a hydrocarbon, with the first fluid or liquid being the vapor phase of the hydrocarbon, the measuring circuit 10 serves to deliver a voltage which is proportional to the temperature of the vapor phase in the tank.

As shown in FIG. 2, the circuit 10 for measuring the temperature of the first fluid or liquid comprises a temperature measuring probe 100 mounted in a bridge circuit including resistors R1, R2, R7, and R8, with the point connecting the probe to the bridge circuit delivering, in operation, a voltage which is proportional to the temperature of the ambient medium around the probe, said voltage being delivered by means of a preamplifier stage 103. The output from the amplifier 103 is connected to a multiplexing input of the multiplexer 6. Similarly, FIG. 2 also shows resistors referenced R, R5, R8, R4, R3, and R6 associated with the measurement circuit 10 and acting, as described above, as biased resistors whose resistances are selected to correspond with the components actually used for constituting the preamplifier 103 and the bridge. An amplifier 102 delivers a constant current to the measurement bridge.

Finally, as also shown in FIG. 2, the multiplexer means 6 are connected to a microprocessor referenced 62 via an amplifier stage 60 and an interface circuit 61 for sampling the measurement values sequentially delivered by the multiplexer 6. The multiplexer 6 is controlled by the third clock signal f3 to cyclically deliver output voltage values representative of the measurement parameters and each value being delivered for a duration 1/f3. The interface circuit 61 is not described since it is a conventional type of interface circuit, with the measurement values naturally being sampled at a clock frequency which is compatible with the frequency f3. Naturally, the interface circuit 61 is connected to the microprocessor 62 over a bus connection BUS. Other embodiments could be provided without going beyond the scope of the present invention.

Apparatus for measuring storage parameters such as the level and the temperature of different-density liquids and fluids in a tank has thus been described, said liquids or fluids being substantially immiscible by virtue of their different densities.

The apparatus described above appears to be particularly effective in that it makes it possible to make direct measurements of parameters which are as varied as the temperature of a liquid or fluid and its level, i.e. its volume. Naturally the microprocessor 61 includes a program for calculating the average temperature of the liquid contained in the tank on the basis of the two above-specified temperature measurements.

I claim:

1. Apparatus for measuring storage parameters such as level and temperature of fluids of different densities in a tank, the apparatus comprising:

a pulse generator for generating pulses at adjustable frequency and delivering a first clock signal at frequency f1, and a pulse shaping circuit delivering calibrated measurement pulses to a delay line constituted by a helical winding disposed substantially vertically inside the tank, whereby said winding is disposed substantially vertically in said fluids, with the end of said delay line disposed in the vicinity of the bottom of the tank being connected to a resistance;

comparator means having a comparison input terminal connected to the inlet terminal of said delay line and having an output for delivering a signal when a pulse is present on said comparison terminal;

a plurality of logic means connected in parallel to the output of said comparator means, with each logic means being firstly switched on by the appearance of a calibrated pulse at the input terminal of the delay line, and being secondly switched off by the corresponding reflection pulse generated by said line at the i-th transition between a medium of order i and a medium of order i+1;

integrator means, with each integrator means of order i being connected to the output of said logic means of corresponding order and serving to generate a voltage proportional to the time for which the corresponding logic means is switched on;

conditional inhibit means having one input receiving said pulses delivered by the comparator means, and n outputs, with outputs of order i and of lower order of the conditional inhibit means delivering a signal for switching off the corresponding logic means on the appearance of the corresponding reflected pulse Ii at the output from the comparator means;

circuit means for measuring the temperature at the top of the tank so as to determine the temperature of a first fluid;

multiplexer means having multiplexing inputs connected to respective ones of the outputs from said integrator means and said circuit means.

2. Apparatus according to claim 1, wherein in the case of two transitions corresponding to three media of different densities in the tank, said plurality of logic means comprises:
- a first logic circuit constituting the first logic means and comprising two two-input NAND gates with the output of the first NAND gate being connected to a first input of the second NAND gate, and with the output of the second NAND gate being connected to the second input of the first NAND gate and also constituting the output from the corresponding logic means;
- a second logic circuit constituting the second logic means and comprising two two-input NAND gates with the output from the first NAND gate being connected to a first input of the second NAND gate, and with the output of the second NAND gate being connected to the second input of the first NAND gate and also constituting the output from the corresponding logic means, the first inputs of the first NAND gates of each of the first and second logic circuits being connected to the output from the comparator means via respective intermediate NAND gates each having a first input connected in cascade to the output of a common NAND gate whose first input is connected to the power supply voltage and whose second input is connected to the output from the comparator means; and
- a two-output conditional inhibit circuit, with the output from the conditional inhibit circuit being connected to respective second inputs of the corresponding intermediate NAND gates.

3. Apparatus according to claim 2, wherein said conditional inhibit circuit comprises:
- a first two-input NAND gate having a first input connected to the output of said common NAND gate and having its second input connected to the power supply voltage;
- a link circuit including a capacitor and a resistor and connected in cascade with a NAND gate whose inputs are connected in parallel and are also connected to the reference voltage via a reverse-biased diode; and
- a logic circuit comprising first and second two-input NAND gates with the output of the first NAND gate being connected to a first input of the second NAND gate and with the output of the second NAND gate being connected to the second input of the first NAND gate, the outputs of said NAND gates constituting the outputs of said conditional inhibit logic means, the first input of the first logic NAND gate being connected to the output of the NAND gate of the link circuit with the second input of the second NAND gate being connected to the output of the pulse shaping circuit for shaping the measurement pulses.

4. Apparatus according to claim 2, further including a servo-control circuit for controlling the trigger threshold of the comparator means in order to obtain pulses of constant width from the output of said comparator means.

5. Apparatus according to claim 1, further comprising:
- a pulse divider circuit receiving a second clock signal of frequency of f2 delivered by the pulse generator, said divider circuit delivering a third clock signal of frequency f3 constituting, via a counter, the stepping signal for said multiplexer;
- a first NAND gate interconnected between said counter and the multiplexer and fed with a reference power supply voltage and whose output periodically delivers said power supply voltage at the frequency f3;
- a second NAND gate having a first input connected to the output of the first NAND gate and having a second input connected to the output of the pulse shaping circuit which delivers the calibrated measurement pulses, said second NAND gate serving to periodically replace the measurement pulses with said power supply voltage, and delivering either measurement pulses or else the power supply voltage to said delay line via a resistor forming a bridge with the delay line and with a decoupling capacitor; and
- a circuit for measuring the average temperature in the tank, said circuit comprising an amplifier having its input terminal connected to the common point between the delay line, the resistor constituting a divider bridge with the delay line, and the decoupling capacitor, the output from said amplifier circuit being connected to a first multiplexing input of the multiplexer.

6. Apparatus according to claim 1, wherein said multiplexer means are connected to a microprocessor, said multiplexer cyclically delivering output signals under the control of the third clock signal f3, said output signals having voltage values which are representative of the measurement parameters with each value being delivered for a duration of 1/f3.

7. Apparatus according to claim 1, wherein said second fluid or liquid is a hydrocarbon and said first fluid or liquid is a vapor phase of said hydrocarbon, and wherein said measurement circuit serves to deliver a voltage which is proportional to the temperature of the vapor phase in the tank.

8. Apparatus according to claim 1, wherein said measurement circuit for measuring the temperature of the first fluid or liquid comprises:
- a temperature measurement probe mounted in a bridge circuit, with the connection point between the probe and the bridge circuit delivering, in operation, and via a preamplifier stage, a voltage which is proportional to the temperature of the ambient medium around the probe; and
- an amplifier stage receiving the signal delivered by the bridge and having its output connected to an input of the multiplexer.

* * * * *